United States Patent [19]

Piltingsrud

[11] 4,086,489
[45] Apr. 25, 1978

[54] ULTRA VIOLET RADIATION PERSONNEL HAZARD METER

[76] Inventor: Harley V. Piltingsrud, 3431 Whitfield Ave., Cincinnati, Ohio 45220

[21] Appl. No.: 765,712

[22] Filed: Feb. 4, 1977

[51] Int. Cl.² .............................................. G01J 1/42
[52] U.S. Cl. ..................................... 250/372; 250/336
[58] Field of Search ...................... 250/372, 373, 336

[56] References Cited

U.S. PATENT DOCUMENTS 3,851,970 12/1974 Adler et al. ........................ 250/372

OTHER PUBLICATIONS

"Portable Meters for the Measurement of Light and Ultraviolet Energy" by Luckiesh et al., General Electric Review, Apr. 1941, pp., 217-221.

*Primary Examiner*—Harold A. Dixon
*Attorney, Agent, or Firm*—Joseph E. Rusz; Richard J. Killoren

[57] ABSTRACT

An ultraviolet radiation personnel hazard monitor having a quartz diffuser which receives ultraviolet radiation. The diffused radiation is then passed through an input slit of a dispersive device such as a prism or a diffraction grating. The spatically dispersed radiation is then passed through another mask having a slit which passes a wavelength band between 230 and 320 nanometers. The radiation is then passed through a plurality of interference filters placed side by side and each having bandpass characteristics corresponding to the wavelength bands applied to them. The radiation is then passed through an adjustable parallel slit collimator which corrects the irregular response obtained from the filters and other wavelength response irregularities of the device, to the desired response curve corresponding to the photobiological response curve of the American Conference of Governmental Industrial Hygienists. The radiation passing through parallel slit device is passed through a converging lens to a photodetector with the output of the photodetector being supplied to a display meter through an operational amplifier.

5 Claims, 8 Drawing Figures

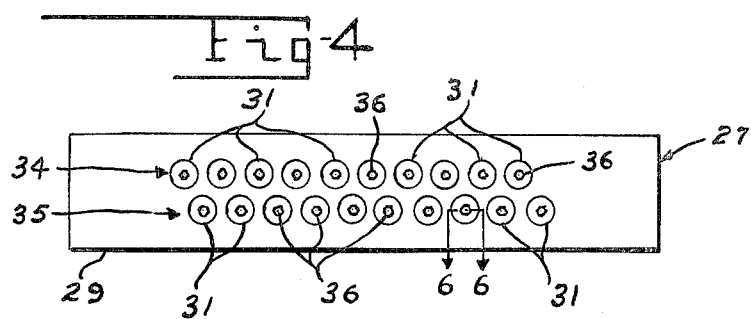
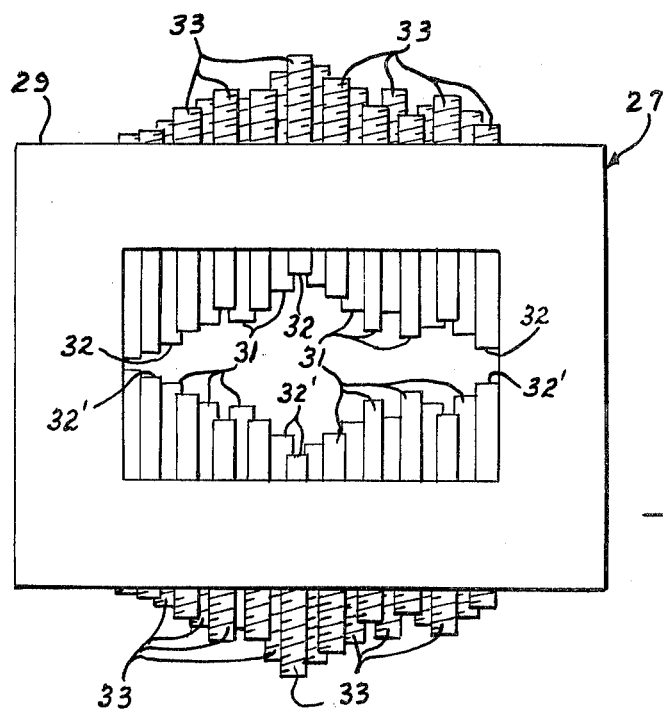
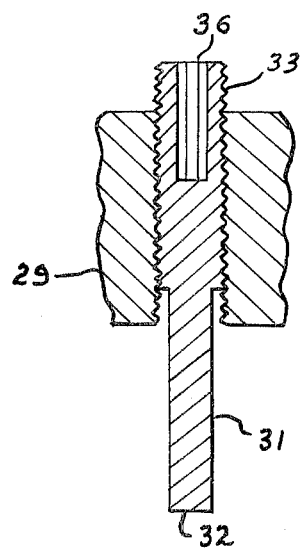

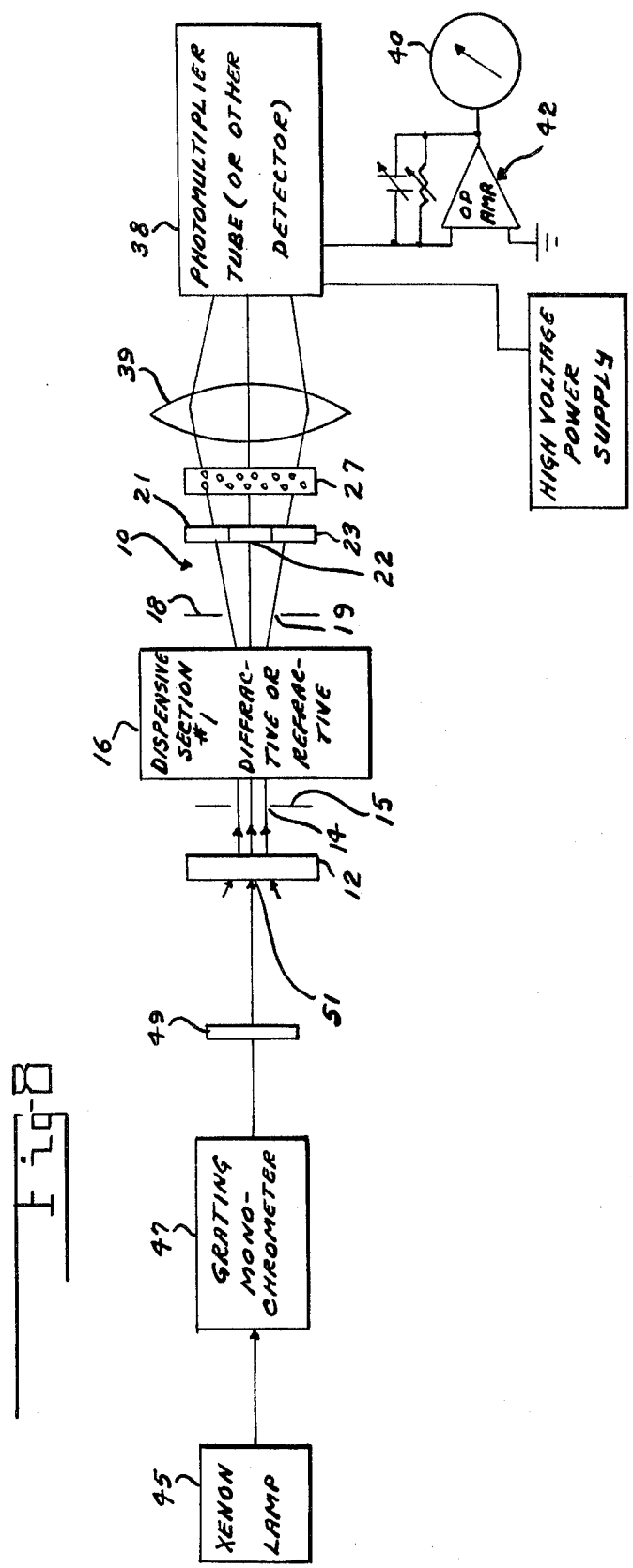

ULTRA VIOLET RADIATION PERSONNEL HAZARD METER

RIGHTS OF THE GOVERNMENT

The invention described herein may be manufactured and used by or for the Government of the United States for all governmental purposes without the payment of any royalty.

BACKGROUND OF THE INVENTION

It is necessary to continually evaluate the hazards, to personnel, from potentially harmful emissions of ultraviolet radiant energy in industrial occupational conditions where sources, such as high intensity electrical gas discharge lamps, arc welders and high-intensity incadescent lamps exist. The patent to Adler et al U.S. Pat. No. 3,851,970, discloses one such monitoring device.

It has been determined that the eyes and skin are not sensitive equally to all wavelengths of ultraviolet light. The American Conference of Governmental Industrial Hygienists has established a curve corresponding to the sensitivity of the eyes and skin to various wavelengths of ultraviolet radiation.

Systems are known which, when calibrated, can measure ultraviolet radiation in a narrow wavelength band. One such device is a spectro radiometer.

To monitor ultraviolet radiation simultaneously over a broad wavelength band, such as 230-320 nanometers, would require many such systems each calibrated to its own narrow wavelength band. Also some sequential system could be used.

The use of about 20 such systems to cover the 230 to 320 nanometer band would be very costly.

There is no known sequential system which would adequately monitor all of the wavelength bands in a rapidly changing ultraviolet radiation field.

Another system which has been proposed for ultraviolet radiation hazards monitoring includes input optics, a prism or grating spectrograph with a mask, shaped to the particular biolobical effects to be evaluated, together with a detector, readout electronics and power supply.

Since the ACGIH curve falls off rapidly in the region between 290 and 320 nm by a factor of about $10^4$, it is difficult to provide a mask to perform this function. Also a mask used alone will not provide adequate sideband rejection in an ultraviolet personnel hazard monitor. The units that irradiance measurements adjusted to the photobiological response curve are indicated in are effective radiance units in $\mu W/cm^2$.

BRIEF SUMMARY OF THE INVENTION

According to this invention, a plurality of interference filters are used on combination with an adjustable parallel slit collimator in a hazards monitor. The interference filters were selected having peak responses at 240 nm, 270 nm and 290 nm. The interference filter with the peak response and 290 nm will provide the rapidly declining slope corresponding to the general shape of the rapidly declining photobiological response over the region between 290 nm and 320 nm. The irregular response as a function of wavelength obtained with the three side by side interference filters is corrected to the desired instrument response curve by means of an adjustable parallel slit collimator. The light passing the interference filters and adjustable parallel slit collimator is applied to a low dark current, high gain photodetector with the output of the photodetector being supplied to a meter display device.

IN THE DRAWINGS

FIG. 4 shows a top view of the parallel slit masking device for the device of FIG. 1.

FIG. 5 is a bottom view of the device of FIG. 4.

FIG. 6 is an enlarged cut away sectional view taken along the line 6—6 of FIG. 3.

FIG. 8 shows the device of FIG. 7 providing a radiation input for the device of FIG. 1.

DETAILED DESCRIPTION OF THE INVENTION

Figure 1:
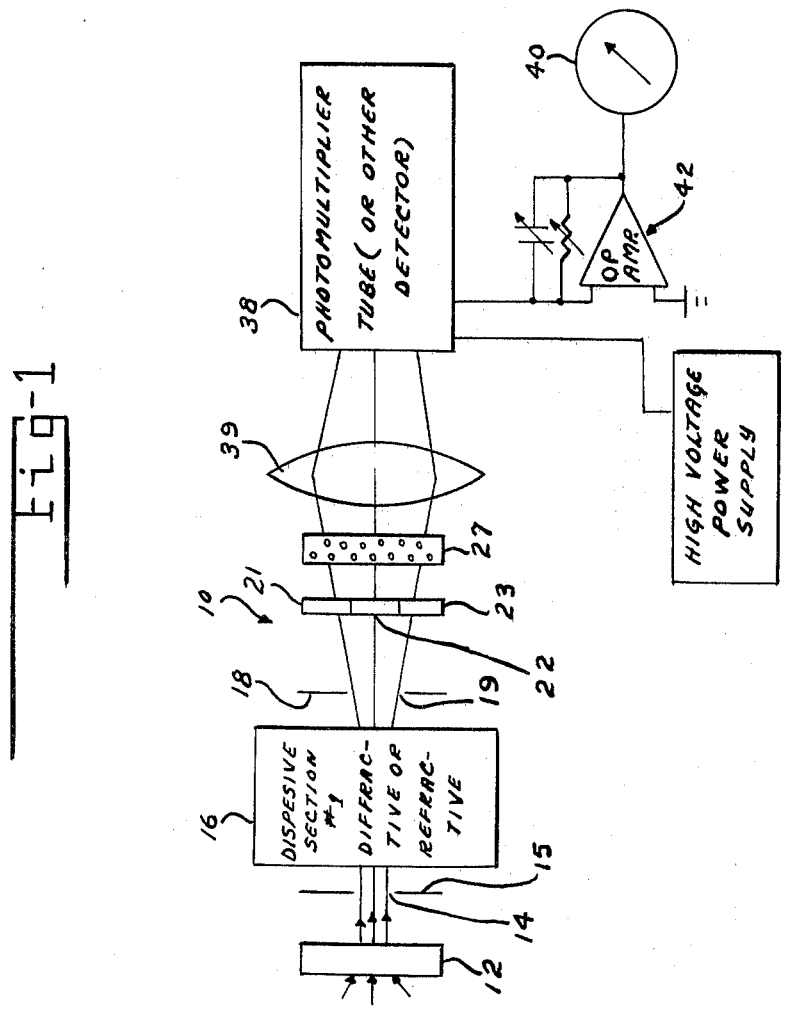
FIG. 1 is a schematic diagram showing the ultraviolet radiation hazard meter of the invention.

Reference is now made to FIG. 1 of the drawing which shows an ultraviolet radiation monitoring apparatus 10 having a quartz diffuser 12, consisting of a sand blasted quartz plate. The quartz plate may be flat as shown or may be shaped to provide cosine response function or preferably a triangular response function.

Figure 2:
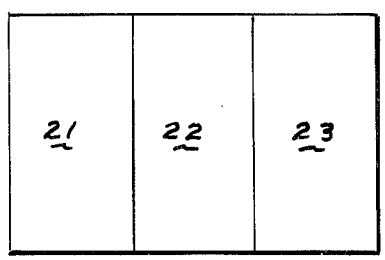
FIG. 2 is an enlarged schematic plan view of the interference filters for the device of FIG. 1.
Figure 3:
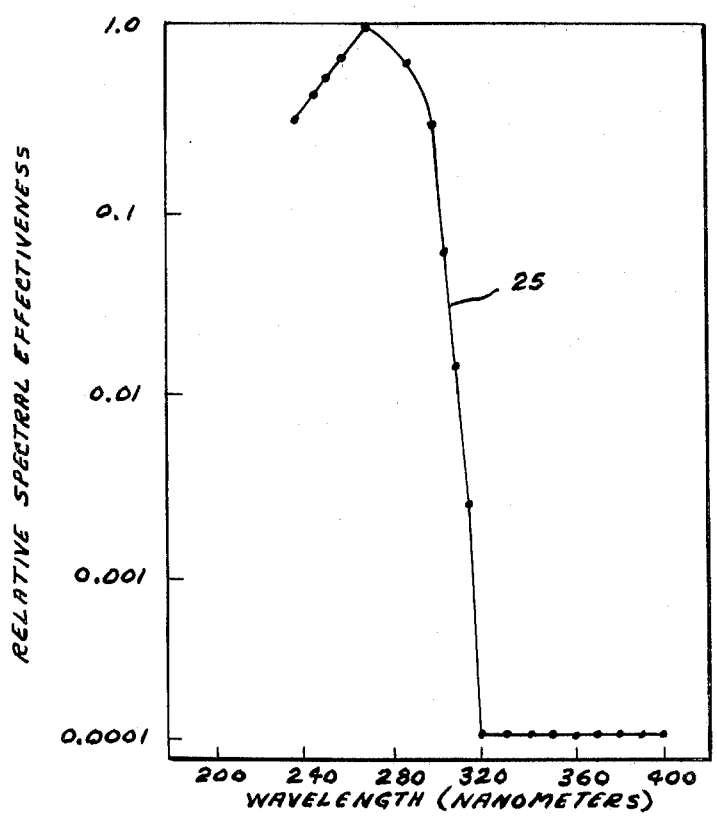
FIG. 3 shows a photobiological response curve of the ACGIH.

Radiation from the diffuser 12 is passed through a slit 14 in mask 15 which provides a sample for dispersive device 16. The device 16 may be a prism or a diffraction grating. The radiation dispersed in device 16 is then passed through a mask 18, having a slit 19, which selects the wavelength band between 230 and 320 nanometers. Radiation in this wavelength band is then passed through a plurality of interference filters 21, 22 and 23, aligned in parallel relationship, as shown in FIG. 2. Each of the interference filters 21, 22 and 23 have a bandpass roughly corresponding to the radiation wavelength band applied to them. The interference filter 21 is selected to have a peak response at 290 nm and an approximate 15 nm full-width-half-maximum resolution and at least $10^3$ side band rejection ratio. This will provide a response shape generally corresponding to the rapidly declining portion 25 of the photobiological response curve, shown in FIG. 3.

The interference filter 22 is selected to have a peak response at approximately 270 nm and the interference filter 23 is selected to have a peak response at approximately 240 nm. More than two interference filters in addition to the interference filter 21 may be used with their peak response being spaced accordingly at wavelengths between 230 and 290 nanometers. The filters 21, 22 and 23 provide additional side band blocking to provide for a high rejection ratio for wavelengths greater than 320 nanometers.

The irregular response as a function of wavelength provided by the interference filters and other components of the system is corrected to the desired instrument response curve by adjustable parallel slit collimator 27, shown in greater detail in FIGS. 4-6. The device 27 has a frame 29 and a plurality of pins 31 having threaded ends 33. The pins 31 are positioned in two rows 34 and 35, as shown in FIG. 4. The pins in row 34 are positioned to cover the spaces between the pins in row 35. The size, of the pins, is selected so that the pins in row 34 slightly overlap the pins in row 35. Hex slots 36 are provided in the ends of pins 31 to permit adjustment of the size of the slits between the parallel faces 32 and 32' of oppositely positioned pins. The radiation which passes device 27 is applied to a low dark current, high gain ultraviolet sensitive photomultiplier tube 38. The photomultiplier tube used in the device constructed was an EMI 9781R. Providing a converging lens 39 between parallel slit collimating device 27 and the photomultiplier will permit the use of a smaller photocathode with a more uniform area sensitivity, and a lower dark current.

The output of the photomultiplier is supplied to a meter 40 through a change sensitive operational amplifier circuit 42. The operational amplifier used in the device constructed was a BurrBrown 3521 operational amplifier.

The hazards monitor device is calibrated by placing its optical input in a known irradiance, nearly monochromatic light field having an adjustable wavelength over the range for which the monitor device is intended to be operated.

Figure 7:
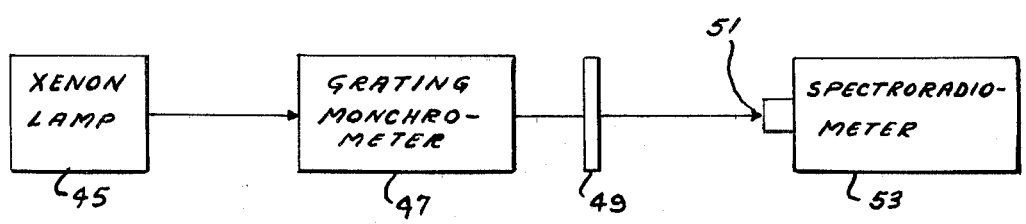
FIG. 7 shows one radiation source which may be used in the calibration of the device of FIG. 1.

An example of one such system is shown in FIG. 7. A xenon lamp 45 is used to provide a continuous light spectrum over the wavelength band of interest. The light from the xenon lamp is passed through an ultraviolet grating or prism monochromator 47. The monochromator used in the calibration of the device was an Oriel 7240 grating monochromator with model 7270 grating. The monochromator is used to select the wavelength band at which calibration is being made. Normally the full width half maximum of the band will be less than the full width half maximum of the parallel slit collimator, that is the bandwidth corresponding to the width of a pair of opposing pins or approximately 5 nm. The selected wavelength band of radiation is passed through a bandpass interference filter 49, having a bandpass corresponding to the wavelength band emitted from the monochromator, to remove stray light leaving the monochromator. Light at a predetermined point 51 in the beam is measured by a spectro radiometer 53, which has been calibrated with a standard lamp of known spectral irradiance under known measurement conditions to provide a response for each wavelength band corresponding to the photobiological response curve. In this way, the irradiance and spectral distribution of light at point 51 is determined. The spectro radiometer 53 is moved and the input optical element quartz diffuser 12 is then positioned at point 51. All of the pins of the parallel slit collimator are adjusted to their wide open position. Like readings are then obtained across the whole spectrum to determine the minimum irradiance reading on meter 40 normallized to a constant effective irradiance value at the input diffuser. The photomultiplier or operational amplifier gain is adjusted to provide a reading on meter 40 identical or slightly greater than the corresponding radiometer reading. With the monochrometer 47 positioned at the wavelength band giving the minimum reading on meter 40 per unit effective irradiance and the input optical element quartz diffuser 12 positioned at point 51, the pins 31 are adjusted to provide an identical reading on meter 40 to that obtained on radiometer 53. A jig may be used in positioning the spectral radiometer and the input optic of the device of the invention at point X, however exact positioning is not critical since the input optic of the device of the invention is a diffuser.

With the radiometer again positioned at point X, the monochrometer 47 is then adjusted to another wavelength band and a reading is obtained on the spectral radiometer 53. With input optic 12 then positioned at point X, pins 31, corresponding to the wavelength band as determined by the monochrometer, are then adjusted to give the same reading on the meter 40. This procedure is then repeated for other wavelength bands until all the pins 31 are properly positioned to give the desired response curve.

In the operation of the device of the invention, radiation from an ultraviolet source, such as an arc welder or electrical gas discharge lamp, is diffused by diffuser plate 12 and sampled by input slit 14 of the dispersive device 16. Mask 18 selects the wavelength band between 230 and 320 nanometers. The interference filters 21, 22 and 23 provide a high rejection ratio for response to light having a wavelength greater or less than their individual band passes. Also, the interference filter 21 will provide a rapidly declining response corresponding to the rapidly declining portion 25 of the photobiological response curve shown in FIG. 3.

The irregular response as a function of wavelength obtained by the three interference filters 21, 22 and 23, along with other device wavelength response irregularities, is corrected to the desired instrument response curve by the adjustable parallel slit collimator 27. The radiation is then applied to photodetector 38 to provide an indication of effective irradiance $\mu W/cm^2$ on meter 40.

Additional side band rejection can be obtained by the use of a second dispersion unit between lens 39 and the photodetector 38 together with appropriate entrance and exit slits.

There is thus provided an ultraviolet radiation hazards meter with high side band rejection and which will provide a response substantially corresponding to the ACGIH photobiological response curve.

I claim:

1. An ultraviolet radiation monitoring system, comprising: a diffuser positioned in radiation energy receiving relation to an ultraviolet radiation source; means positioned adjacent said diffuser for limiting light from the diffuser to a predetermined path; means in said light path for spatially dispersing the light as a function of wavelength, a plurality of light interference filters, in the output of said light spatially dispersing means; a mask between said light dispersing means and said interference filters for passing only a predetermined wavelength band of radiation to said interference filters; said light interference filters each having certain predetermined bandpass characteristics; each of said light interference filters being positioned to receive certain predetermined wavelengths corresponding to the band pass characteristics of the filters; a photodetector in energy receiving relation to said bandpass interference filters; means positioned between said interference filters and said photodetector to selectively adjust the transfer function of the various radiation wavelength bands to desired values; means connected to the output of said photodetector for indicating the ultraviolet radiation corresponding to the desired wavelengths.

2. The device as recited in claim 1 wherein said means between the light dispersing means and the interference filters for passing only a predetermined wavelength band of radiation includes a mask having a slit for passing ultraviolet radiation between 230 nm and 320 nm; said interference filters being selected to have peak responses at approximately 240 nm, 270 nm and 290 nm.

3. The device as recited in claim 2 wherein said means for selectively adjusting the transfer function of the various radiation wavelengths includes: a frame member having a rectangular shaped opening; a first row of spaced pins extending into said opening along one side of said rectangular shaped opening; a second row of spaced pens, extending into said opening, adjacent said first row, with the pins, in the second row, masking the spaces between the pins in the first row of pins; a third row of spaced pins extending into said opening along the side of said rectangular shaped opening opposite said one side; the pins in said third row being in axial alignment with the pins in said first row and having their ends substantially parallel to the ends of the pins in the first row; a fourth row of spaced pins, extending into said opening, adjacent said third row, with the pins in the fourth row masking the spaces between the pins in the third row of pins; the pins in said fourth row being in axial alignment with the pins in said second row and having their ends substantially parallel to the ends of the pins in the second row; means for adjusting the spacing between the pins in the first row and the corresponding pins in the third row and means for adjusting the spacing between the pins in the second row and the corresponding pins in the fourth row.

4. An adjustable parallel slit collimating device comprising: a frame member having a rectangular shaped opening; a first row of spaced pins extending into said opening along one side of said rectangular shaped opening; a second row of spaced pins, extending into said opening, adjacent said first row, with the pins, in the second row, masking the spaces between the pins in the first row of pins; a third row of spaced pins extending into said opening along the side of said rectangular shaped opening opposite said one side; the pins in said third row being in axial alignment with the pins in said first row and having their ends substantially parallel to the ends of the pins in the first row; a fourth row of spaced pins, extending into said opening, adjacent said third row, with the pins in the fourth row masking the spaces between the pins in the third row of pins; the pins in said fourth row being in axial alignment with the pins in said second row and having their ends substantially parallel to the ends of the pins in the second row; means for adjusting the spacing between the pins in the first row and the corresponding pins in the third row and means for adjusting the spacing between the pins in the second row and the corresponding pins in the fourth row.

5. The device as recited in claim 4 wherein said means for adjusting the spacing between corresponding aligned pins including threaded end portions threaded into said frame member and means for turning the pins in the frame.

* * * * *